Figure 1:
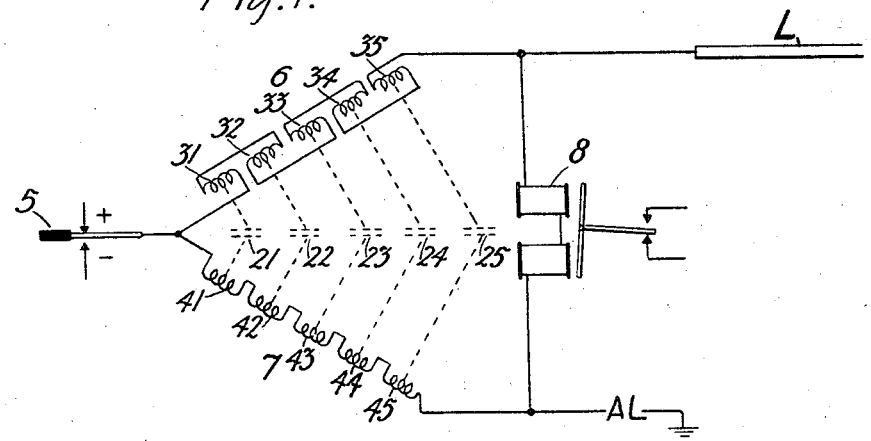

Oct. 30, 1923.

R. C. MATHES

TELEGRAPH SYSTEM

Filed Oct. 21, 1919

1,472,483

Inventor:
Robert C. Mathes
by Joel C R. Palmer
Atty.

Patented Oct. 30, 1923.

1,472,483

UNITED STATES PATENT OFFICE.

ROBERT C. MATHES, OF NEW YORK, N. Y., ASSIGNOR TO WESTERN ELECTRIC COMPANY, INCORPORATED, OF NEW YORK, N. Y., A CORPORATION OF NEW YORK.

TELEGRAPH SYSTEM.

Application filed October 21, 1919. Serial No. 332,258.

*To all whom it may concern:*

Be it known that I, ROBERT C. MATHES, a citizen of the United States, residing at New York, in the county of New York, State of New York, have invented certain new and useful Improvements in Telegraph Systems, of which the following is a full, clear, concise, and exact description.

This invention relates to electrical systems and particularly to the method of winding and connecting the ratio arms of a duplex network.

The principal object of this invention is to provide means whereby a high degree of symmetry may be produced between the two ratio arms of a duplex bridge.

When the windings of a duplex bridge are applied to an iron core in the form of a twisted pair, the inductive balance will for all practical purposes be perfect, but with such an arrangement, the capacity distribution between the windings will be quite unsymmetrical. The capacity between the two windings will be uniformly distributed and symmetrical if the windings are applied simultaneously and in opposite directions uniformly along the core. By means of this invention substantially the same degree of symmetry of capacity distribution may be obtained by forming the windings of each ratio arm in a large number of small sections and twisting together one of such sections of one ratio arm with one of such sections of the other ratio arm to form one single element of the winding. In other words, if the sections of the ratio arms are arranged alternately on the core and numbered consecutively progressing for example, from the apex of the duplex bridge to the main and artificial lines, each ratio arm winding will be made up of alternate odd and even numbered coils. Now, if the section terminals of each ratio arm are connected together so that the lines of force set up by the transmitted impulses tend to oppose one another or are made non-inductive, the inductive balance may be maintained practically perfect.

Thus, it will be seen that if the windings of the two ratio arms are formed into a large number of small sections arranged alternately on the core so that corresponding or homologous parts of the two windings are adjacent one another and the terminals of the several sections are connected in such a manner that the lines of force set up in the two windings by the transmitted impulses will be parallel opposing and that the lines of force set up in the two windings by the incoming impulses will be series aiding, the capacity between the two windings of the ratio arms will be uniformly distributed and quite symmetrical and the inductive balance between the two windings will be practically perfect.

Figure 2:
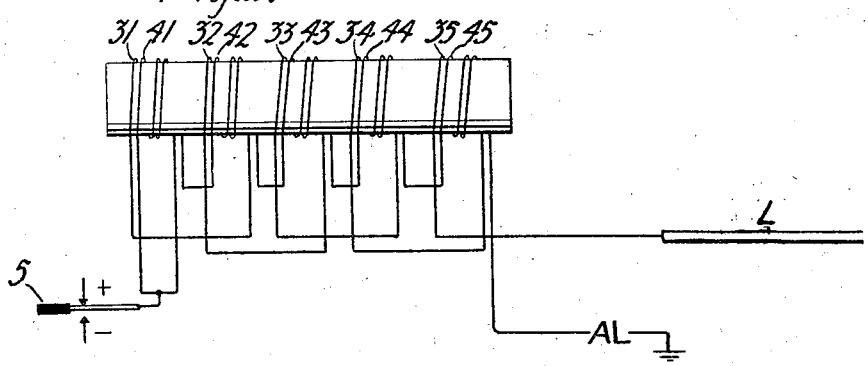

This invention will be more clearly understood from the following description and claims, and by reference to the accompanying drawings wherein Fig. 1 shows a duplex bridge equipment and Fig. 2 shows the ratio arms of a duplex bridge applied to a suitable magnetic core as in ordinary practice. The transmitting key 5 is shown connected to the apex of the inductive ratio arms 6 and 7 of a duplex bridge. The other terminal of the ratio arm 6 is connected to a transmission line or submarine cable circuit L and the other terminal of the ratio arm 7 is connected to the customary artifical line AL for balancing the impedance of the line or cable circuit. The transmitting key 5 is adapted to be actuated to send out reversals of current by connecting positive or negative potential to the line. Across the ratio arms is shown connected in the usual manner an electro-responsive device 8 which responds to incoming signals and is unresponsive to outgoing signals.

Referring particularly to Fig. 1, it will be noted that the windings of the ratio arms 6 and 7 are arranged in sections and that the sections of arm 6 are connected to one another and to the line L so that the impulses received from a distant station will pass through the windings of the arm 6 in the same direction as through the windings of the arm 7. That is, the impulses received over the line L will pass from left to right through each section of arm 6 and likewise with respect to arm 7, and consequently the lines of force set up by received impulses passing through the ratio arm 6 will be in the same direction as lines of force set up by the line impulses passing through the winding of ratio arm 7.

Considering the effects produced by current impulses sent out by means of the transmitting key 5, it will be noted that the current impulses in passing through the windings of ratio arm 6 will pass from right to left while the impulses in passing through the windings of ratio arm 7 will pass from left to right. Thus the lines of force set up by the transmitted impulses in the ratio arm 6 will be in opposite direction to the lines of force set up by the transmitted impulses in traversing the windings of ratio arm 7. Condensers 21, 22, 23, 24 and 25 represent the capacity between sections 31, 32, 33, 34 and 35 of ratio arm 6 and homologous sections 41, 42, 43, 44 and 45 respectively of ratio arm 7. This method of winding the coils of a duplex network possesses the advantage of producing a uniform distribution of capacity between the two ratio arms and particularly between adjacent sections of the two coils.

This invention is particularly applicable for use in submarine cable signaling although not limited to such use.

What is claimed is:

1. The method of winding the ratio arms of a duplex telegraph set which consists in forming the winding of each arm in a plurality of sections and arranging the sections of the two arms alternately with respect to each other whereby the sections of one arm aid the sections of the other arm under certain conditions and oppose under other conditions.

2. The method of winding the ratio arms of a duplex telegraph set which consists in forming the winding of each arm in a plurality of serially connected sections and arranging the sections of the two arms alternately with respect to each other whereby the distributed capacity between the winding of each arm will be uniform and symmetrical.

3. In a duplex equipment comprising two windings, a core on which said windings are mounted, one of said windings being wound in sections and in a right-hand direction, the other of said windings being wound in sections and arranged alternately with respect to the sections of the first mentioned winding, one terminal of each of said windings being connected together and forming the apex of the duplex equipment, and homologous sections of the two windings arranged so that the capacity distribution between the two windings is uniform and symmetrical throughout.

4. A transmission system having a magnetic core with two windings applied thereon, one of said windings arranged in a plurality of sections and placed equidistances apart on said core, the other of said windings formed into a plurality of sections and arranged equidistances apart on said core and alternately with respect to the sections of the first winding, said sections of each winding being so connected that the lines of force set up by the transmitted impulses will be parallel opposing, and those set up by incoming impulses will be series aiding.

In witness whereof, I hereunto subscribe my name this 14th day of October, A. D., 1919.

ROBERT C. MATHES.